United States Patent [19]

Osaki

[11] Patent Number: 5,029,307

[45] Date of Patent: Jul. 2, 1991

[54] SYNTHETIC APERTURE RADAR APPARATUS

[75] Inventor: Kyoko Osaki, Kamakura, Japan

[73] Assignee: Director General, Agency of Industrial Science and Technology, Japan

[21] Appl. No.: 397,648

[22] Filed: Aug. 23, 1989

Related U.S. Application Data

[63] Continuation of Ser. No. 175,194, Mar. 30, 1988, abandoned.

[51] Int. Cl.⁵ ............................................. G01S 13/90
[52] U.S. Cl. ...................................................... 342/25
[58] Field of Search .......................................... 342/25

[56] References Cited

U.S. PATENT DOCUMENTS

| | | | |
|---|---|---|---|
| 4,034,370 | 7/1977 | Mims | 342/25 |
| 4,084,158 | 4/1978 | Slawsby | 342/25 |
| 4,471,357 | 9/1984 | Wu et al. | 342/25 |
| 4,692,765 | 9/1987 | Politis et al. | 342/25 X |
| 4,706,088 | 11/1987 | Weindling | 342/25 |
| 4,706,089 | 11/1987 | Weindling | 342/25 |
| 4,723,124 | 2/1988 | Boles | 342/25 |
| 4,724,418 | 2/1988 | Weindling | 342/25 |

FOREIGN PATENT DOCUMENTS 61-157872 9/1986 Japan.

*Primary Examiner*—John B. Sotomayor
*Attorney, Agent, or Firm*—Leydig, Voit & Mayer

[57] ABSTRACT

A synthetic aperture radar apparatus comprising an altitude calculation device, and means to feed back altitudinal information obtained by the altitude calculation device, to a synthetic aperture radar device in the synthetic aperture radar apparatus at all times. Thus, an observational region is observed with the synthetic aperture radar device, while at the same time, the altitude of an artificial satellite is calculated by measuring the acceleration thereof in the altitude calculation device, the altitudinal information being continually fed back to an operation controller in the synthetic aperture radar device, whereby the synthetic aperture radar device is operated continuously and automatically.

2 Claims, 3 Drawing Sheets

SYNTHETIC APERTURE RADAR APPARATUS

This application is a continuation of application Ser. No. 07/175,194, filed Mar. 30, 1988 now abandoned.

BACKGROUND OF THE INVENTION

This invention relates to a synthetic aperture radar apparatus. More particularly, it relates to a synthetic aperture radar apparatus constructed of a synthetic aperture radar device which is mounted in an artificial satellite and with which a land surface, etc. are observed, and an altitude calculation device which is mounted in the artificial satellite and which measures the acceleration of the satellite, thereby to calculate the altitude of the satellite.

FIG. 2 is a diagram showing an example of a prior-art synthetic aperture radar apparatus. In the figure, numeral 1 designates a transmitter, numeral 2 a circulator, numeral 3 an antenna, numeral 4 the earth, numeral 5 a receiver, numeral 6 a data recorder, and numeral 7 an operation controller.

A transmission pulse sent from the transmitter 1 in the synthetic aperture radar apparatus is led through the circulator 2 to the antenna 3, and it is thereafter radiated as an electric wave from the antenna 3 toward the earth 4. This electric wave is scattered in various directions on the surface of the earth 4. Some of the scattered waves are received by the antenna 3 again. The received waves, namely, observational echoes are led through the circulator 2 to the receiver 5, and they are subjected to amplification, frequency conversion and analog-to-digital conversion by the receiver 5. The digital data thus obtained is recorded by the data recorder 6.

The above operations are repeatedly performed every transmission pulse that is transmitted at a fixed period with the movement of an artificial satellite, not shown, carrying the synthetic aperture radar apparatus. Herein, all of control commands such as an observation start command for the synthetic aperture radar apparatus, an ON/OFF command for the power source of the transmitter 1, a command for setting the pulse-recurrence frequency of the transmitter 1, a command for setting the gain of the receiver 5, a record/reproduce command for the data recorder 6, and an observation end command, are delivered from the operation controller 7. Image processing is executed on the basis of the observational data recorded on the data recorder 6, whereby the image of an observed region is obtained.

Meanwhile, in the case of observing a land surface or the like with the synthetic aperture radar apparatus, the transmission pulse which is transmitted from the transmitter 1 must be transmitted at a timing at which the following two conditions are satisfied:
(1) The transmission pulse and an echo from the observed region do not overlap.
(2) A nadir echo (an echo from a point lying just under the satellite) and an echo from the observed region do not overlap.

Accordingly, the pulse-recurrence frequency of the transmission pulses is set so as to meet the aforementioned conditions. However, the propagation distance of the pulse varies according to changes in a distance from the artificial satellite to the observed region, namely, the altitude of the satellite, so that the timing comes to deviate.

It is therefore necessary that several pulse-recurrence frequencies of the transmission pulses are prepared beforehand in anticipation of the fluctuating component of the altitude, and that the pulse-recurrence frequency is properly selected and set according to the satellite altitude.

Since the satellite altitude varies depending upon an observed position on the earth, a predetermined pulse-recurrence frequency has heretofore been selected and set according to the observed position on the earth as illustrated in FIG. 3 by way of example. For example, in case of observing a region which belongs to a first zone, the pulse-recurrence frequency of the transmitter 1 needs to be set at $f_1$, and in case of observing a region which belongs to a second zone, the pulse-recurrence frequency of the transmitter 1 needs to be set at $f_2$. The same applies to a frequency $f_3$ corresponding to a third zone, and a frequency $f_4$ corresponding to a fourth zone.

Accordingly, in a case where the synthetic aperture radar apparatus is mounted on a flying object such as the artificial satellite for the purpose of observing a land surface etc., the setting of the pulse-recurrence frequency of the transmitter 1 needs to be altered according to the change of an observed zone.

With the prior-art synthetic aperture radar apparatus as stated above, the orbital changes of the satellite are predicted, and the operation of altering the pulse-recurrence frequency in accordance with altitudinal changes attendant upon the orbital changes is programmed for the operation of the radar apparatus. A command for altering the pulse-recurrence frequency on the basis of the program is delivered from the operation controller 7 to the transmitter 1. With such a programmable operation based on the predicted changes, however, only the setting operations based on predictive data are possible to the last, and the setting of the pulse-recurrence frequency according to an actual altitudinal change cannot be realized.

Accordingly, an unexpected altitudinal change on the orbit of the satellite cannot be coped with, so that an accurate pulse recurrence frequency cannot be set.

SUMMARY OF THE INVENTION

This invention has been made in order to solve such a problem, and has for its object to provide a synthetic aperture radar apparatus which is furnished with an altitude calculation device, thereby to be automatically operated.

The synthetic aperture radar apparatus according to this invention includes the altitude calculation device therein, and also comprises means to feed back altitudinal information obtained by the altitude calculation device, to a synthetic aperture radar device in the synthetic aperture radar apparatus at all times.

In this invention, an observational region is observed with the synthetic aperture radar device, while at the same time, the altitude of an artificial satellite is calculated by measuring the acceleration thereof in the altitude calculation device, the altitudinal information being continually fed back to an operation controller in the synthetic aperture radar device, whereby the synthetic aperture radar device is operated continuously and automatically.

BRIEF DESCRIPTION OF THE DRAWINGS

Throughout the drawings, the same symbols indicate identical or equivalent portions.

DESCRIPTION OF THE PREFERRED EMBODIMENT

Figure 1:
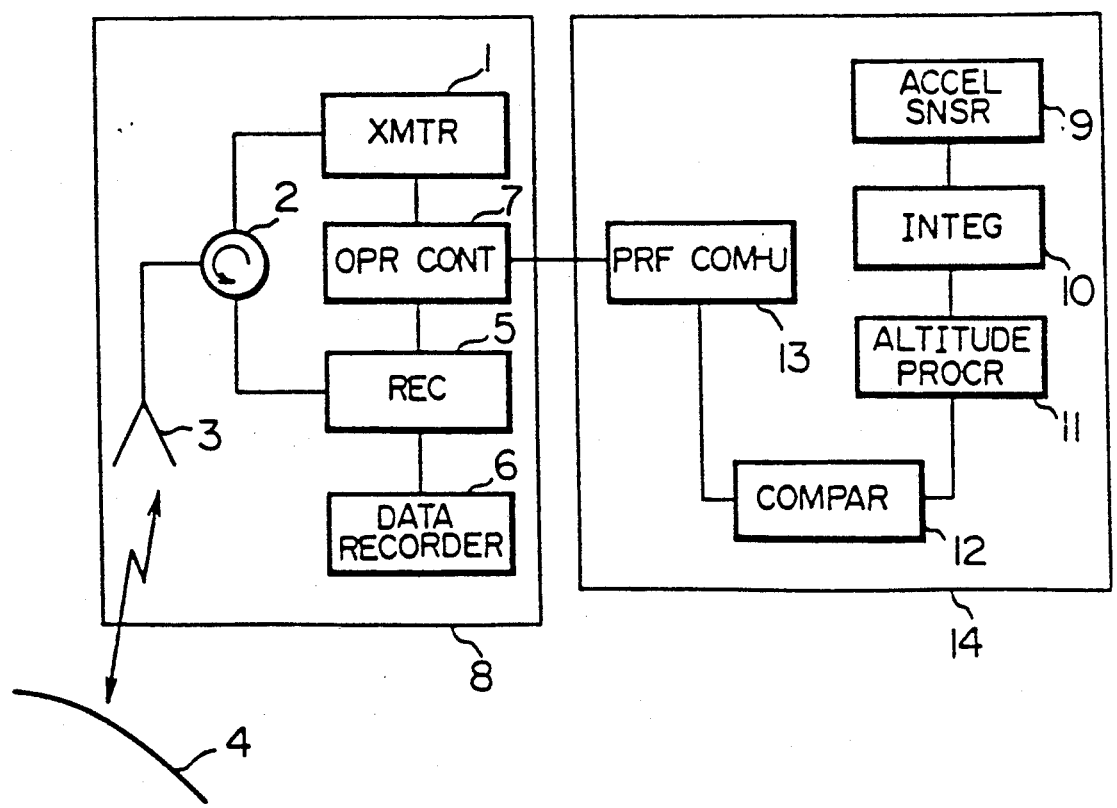
FIG. 1 is a diagram showing a synthetic aperture radar apparatus in an embodiment of this invention.

FIG. 1 is a diagram showing a synthetic aperture radar apparatus which is an embodiment of this invention.

Figure 2:
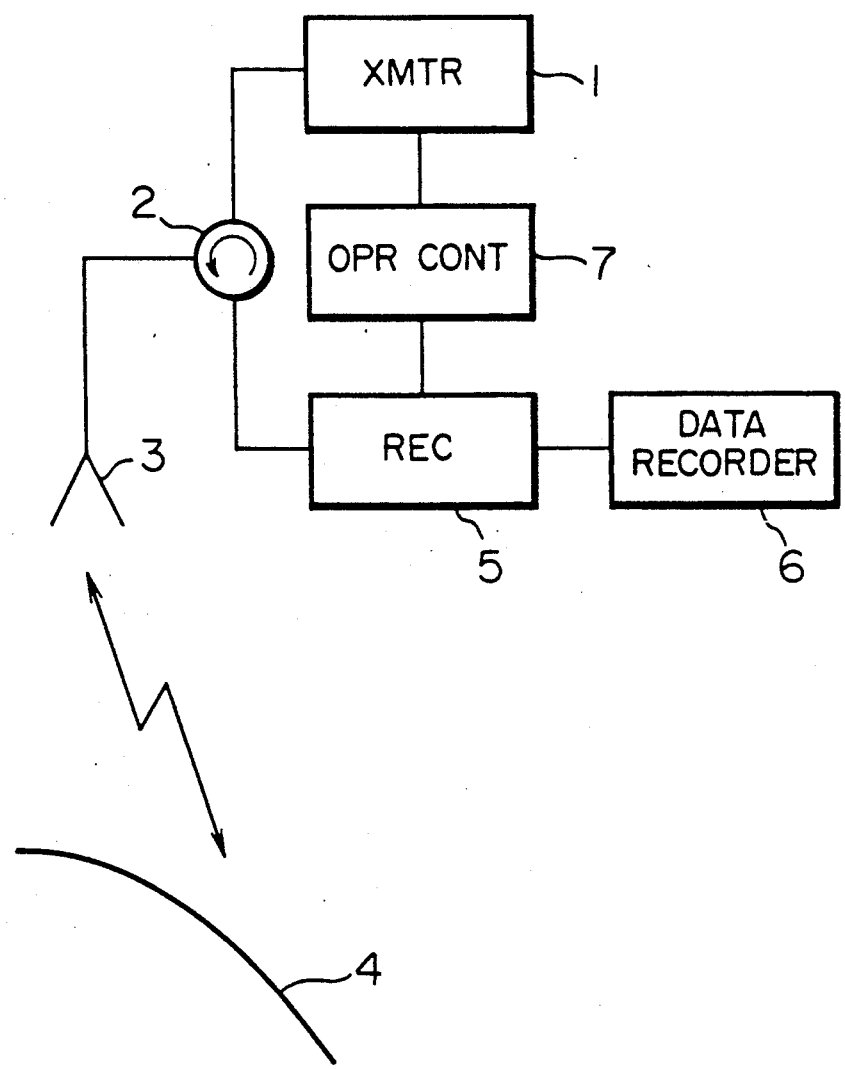
FIG. 2 is a diagram showing a synthetic aperture radar apparatus in a prior art.
Figure 3:
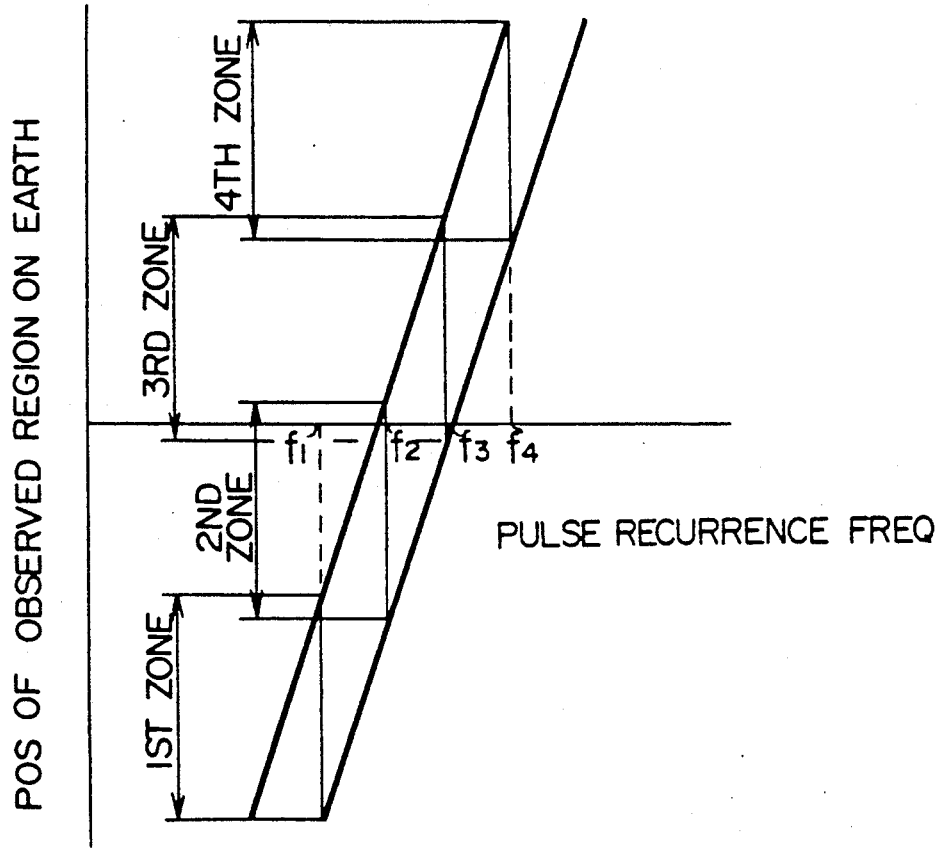
FIG. 3 is a graph for explaining the setting of a pulse-recurrence frequency as depends on the position of an observed region.

Parts 1-7 are the same as in the prior-art apparatus shown in FIG. 2. Numeral 8 designates a synthetic aperture radar device, numeral 9 an acceleration sensor, numeral 10 an integrator, numeral 11 an altitude processor, numeral 12 a comparator, numeral 13 a pulse-recurrence frequency (PRF) command unit, and numeral 14 an altitude calculation device.

In the synthetic aperture radar apparatus thus constructed, the observation of an observational region is continued by the synthetic aperture radar device 8 at all times.

On the other hand, the calculation of the altitude of an artificial satellite relative to an observed position on the earth is carried out by the altitude calculation device 14 simultaneously in parallel with the observation by the synthetic aperture radar device 8. This calculation of the altitude is executed by steps to be stated below: First, the acceleration of the satellite is measured by the acceleration sensor 9 in the altitude calculation device 14. Thereafter, the measured acceleration is integrated in the integrator 10, with the result that the velocity of the artificial satellite is evaluated. The evaluated velocity information is led to the altitude processor 11, in which the altitude of the artificial satellite is computed. The altitude h is obtained according to Eq. (2) on the basis of Kepler's third law indicated by Eq. (1):

$$\text{Kepler's third law} \quad T^2 = \frac{4\pi^2 a^3}{GM} \quad (1)$$

where
T: period,
a: major radius,
M: mass of the earth, and
G: gravitational constant.

$$h = \frac{GM}{v^2} - R_o \quad (2)$$

where
v: velocity of the satellite, and
$R_o$: radius of the earth.

In the comparator 12, the altitude h obtained is compared with altitudes prepared beforehand and corresponding to several kinds of observational zones, so as to decide the observational zone to which the current position on the earth being observed by the synthetic aperture radar device 8 belongs.

Further, the PRF command unit 13 selects a pulse-recurrence frequency appointed to a certain observational zone (for example, $f_1$ in the first observational zone) and inputs the selected information to the operation controller 7 of the synthetic aperture radar device 8.

That is, the computation of Eq. (2) is executed in the altitude processor 11, whereby the altitude is found from the acceleration of the artificial satellite, and the pulse-recurrence frequency suited to the altitude can be automatically selected on each occasion.

In the synthetic aperture radar apparatus of this invention, accordingly, the altitudinal information from the altitude calculation device 14 is always fed back to the operation controller 7 in the synthetic aperture radar device 8 in order that the pulse-recurrence frequency responsive to an altitudinal change may be automatically set for the transmitter 1. Therefore, even when the altitude of the artificial satellite relative to the observed position on the earth varies every moment, the command information of the pulse-recurrence frequency obtained on the basis of the altitudinal information is continually fed back to the operation controller 7. Consequently, even in a case where the alteration of the pulse-recurrence frequency is required due to an altitudinal fluctuation, a command for altering the pulse-recurrence frequency is automatically delivered from the operation controller 7 to the transmitter 1.

That is, the synthetic aperture radar apparatus can be operated at all times by the use of the pulse-recurrence frequency which is appointed according to the information of the actual altitude.

As described above, this invention has the effect that, since the pulse-recurrence frequency of a synthetic aperture radar device is automatically set and updated according to altitudinal information obtained in an altitude calculation device, the continuous automatic operation of the synthetic aperture radar device becomes possible.

What is claimed is:

1. A synthetic aperture radar apparatus comprising:
   a synthetic aperture radar device mounted in an artificial satellite and which includes means for observing an observational region by transmitting transmission pulses at one of a plurality of predetermined pulse-recurrence frequencies that are respectively set for a plurality of ranges of satellite altitudes relative to the observational region and receiving echoes of the transmission pulses; and
   an altitude calculation device mounted in the artificial satellite and which includes measurement means for measuring an acceleration of the artificial satellite, calculation means for calculating an altitude of the artificial satellite on the basis of the acceleration measured by said measurement means and including means for integrating the measured acceleration to produce a velocity v and means for calculating an altitude h according to the formula $$h = GM/v^2 - R_0$$

where
G is the gravitational constant,
M is the mass of the earth, and
$R_0$ is the radius of the earth, and
means for selecting a predetermined pulse-recurrence frequency in accordance with the calculated altitude and feeding information concerning the selected frequency back to said synthetic aperture radar device, the predetermined pulse-recurrence frequency having a value such that, at the calculated altitude, a transmission pulse and an echo from an observed region do not overlap, and a nadir echo and an echo from the observed region do not overlap.

2. A synthetic aperture radar apparatus for an artificial satellite comprising:

a synthetic aperture radar device mounted in an artificial satellite and which includes means for observing an observational region on the earth by transmitting transmission pulses at one of a plurality of predetermined pulse-recurrence frequencies that are respectively set for a plurality of ranges of satellite altitudes relative to the observational region and receiving echoes of the transmission pulses, the frequencies having values such that a transmission pulse and an echo from the observational region do not overlap, and a nadir echo and an echo from the observed region do not overlap, and an altitude calculation device which feeds back information of the satellite altitude to said synthetic aperture radar device;

(a) said synthetic aperture radar device including a transmitter and a receiver which are connected to an antenna through a circulator so as to transmit and receive electric waves, respectively, a data recorder which is connected to said receiver so as to obtain observational data from the received electric wave and to record it, and an operation controller which controls operation of said transmitter and said receiver at the pulse-recurrence frequency and (b) said altitude calculation device including an acceleration sensor which senses an acceleration of the artificial satellite, an integrator which computes a satellite velocity on the basis of the acceleration sensed by said acceleration sensor, an altitude processor which computes the satellite altitude h on the basis of the velocity v computed by said integrator using the formula $h = GM/v^2 - R_0$ where
G is the gravitational constant,
M is the mass of the earth, and
$R_0$ is the radius of the earth,
a comparator which determines which of the plurality of ranges of satellite altitudes corresponds to the altitude obtained by said altitude processor, and a pulse-recurrence frequency command unit which selects a corresponding pulse-recurrence frequency and supplies said operation controller of said synthetic aperture radar device with a signal of the frequency selected by said command unit.

* * * * *